(12) United States Patent
Myrick

(10) Patent No.: US 6,536,571 B1
(45) Date of Patent: Mar. 25, 2003

(54) SPLIT LOCKING SPRAG

(75) Inventor: Thomas N. Myrick, Warren, NJ (US)

(73) Assignee: Honeybee Robotics Ltd., New York, NY (US)

( * ) Notice: Subject to any disclaimer, the term of this patent is extended or adjusted under 35 U.S.C. 154(b) by 0 days.

(21) Appl. No.: 09/658,829

(22) Filed: Sep. 8, 2000

Related U.S. Application Data

(60) Provisional application No. 60/153,471, filed on Sep. 9, 1999.

(51) Int. Cl.$^7$ .............................. F16D 41/07; B60L 5/00
(52) U.S. Cl. .................... 192/45.1; 192/41 A; 188/82.8; 188/82.84
(58) Field of Search .................. 192/45.1, 41 A, 192/43; 188/6, 82.8, 82.84, 82.3

(56) References Cited

U.S. PATENT DOCUMENTS 5,482,144 A * 1/1996 Vranish .................... 188/6
5,518,094 A * 5/1996 Myrick .................... 192/45.1
5,836,701 A * 11/1998 Vranish .................... 384/565
5,967,267 A   10/1999 Vranish

* cited by examiner

Primary Examiner—Saul Rodriguez
(74) Attorney, Agent, or Firm—Leighton K. Chong

(57) ABSTRACT

A split locking sprag is used as a locking element between an inner race portion and an outer race portion which are moved or driven relative to each other, and has a release linkage that allows the sprag halves to be moved relative to each other to change the combined dimensions of the sprag halves and allow their displacement out of engagement with the inner and outer races. The sprag is divided into two or more sections that pivot about a main pivot pin between locked and unlocked positions. A linkage and tripper mechanism allows the sprag sections to be unlocked in a controlled manner by applying a small external force to the tripper. Alternatively, the sprag can be configured in any manner that allows their combined dimensions to be changed when triggered to release a torque while under load.

3 Claims, 5 Drawing Sheets

SPLIT LOCKING SPRAG

This U.S. patent application claims the priority filing date of U.S. Provisional Application No. 60/153,471 filed on Sep. 9, 1999, of the same title and by the same inventor.

TECHNICAL FIELD

This invention generally relates to a device for braking or locking a rotating element, such as brake or clutch, and more particularly, to a device which employs cam-shaped sprags as the locking elements.

BACKGROUND OF INVENTION

Prior clutch or brake devices have used various types of rollers, sprags, or cam elements for engaging and releasing torque transmission between input and output members. Such locking elements have generally taken the form of cylindrical rollers, spherical balls, or cam shapes of various designs. The locking elements in conventional clutch or brake devices have a limit to their torque capacity due to their design and the loading dynamics (two-dimensional in nature). The wear on these conventional locking elements becomes excessive (due to high contact stresses) as the load increases. This reduces the life cycle and performance of the unit and may also result in the elements going "over-center" as the wear progress.

Recent developments have used sprags effectively as the locking elements between the inner and outer races of a clutch or brake. Improvements have also been obtained by using sprags with a three-dimensional shape in the direction of the Z (rotational) axis, in order to provide performance and service life characteristics that are superior to sprags that have only two-dimensional (2D) geometries. An example of a 3D area locking sprag is described in commonly owned U.S. Pat. No. 5,518,094 issued to the same inventor on May 21, 1996, which is incorporated by reference herein for explanation of the general operation of a sprag locking device.

However, it is desirable in the use of 2D or 3D sprags as locking elements to have the ability to quickly and easily disengage or release the sprags of a brake or clutch while they are operating under a holding torque.

SUMMARY OF INVENTION

In accordance with the present invention, a split locking sprag, adapted to be used as a locking element between an inner race portion and an outer race portion which are moved or driven relative to each other, is comprised of: (a) a pair of sprag subsections mounted opposite each other between the inner and outer races, wherein one sprag subsection has a sprag surface which is engageable with the inner race and the other sprag subsection has a sprag surface which is engageable with the inner race, said sprag subsections being movable relative to each other between a locking position in which the dimensions of the sprag subsections are combined together to present their respective sprag surfaces for engagement with the inner and outer races, and an unlocking position in which the sprag subsections are moved to change their combined dimensions to allow displacement of their respective sprag surfaces out of engagement with the inner and outer races, a biasing element for holding the sprag subsections in the locking position, and an actuator element for applying a release force to move the sprag subsections to the unlocking position.

In a preferred embodiment, a sprag is divided into two or more sections that pivot about a main pivot pin between locked and unlocked positions. A linkage and tripper mechanism allows the sprag sections to be unlocked in a controlled manner by applying a small external force to the tripper. Alternatively, the sprag can be configured in any manner that allows their combined dimensions to be changed when triggered to release a torque while under load. The split locking sprag can be applied to both 2-dimensional and 3-dimensional locking sprag surfaces.

When used as a one way over-running clutch, the sprags can be triggered to instantly release the torque without having to first remove the source of the torque. Since the sprags can be commanded to release independently of the applied torque, they can also be paired in opposite directions so that each sprag pair can hold torque in both directions. In this configuration, the sprag pair acts as a brake. Because traditional sprags cannot be triggered to release (with an applied torque load), they cannot be placed in opposite pairs to act as a brake.

Other objects, features, and advantages of the present invention will be explained in the following detailed description of the invention having reference to the appended drawings.

DETAILED DESCRIPTION OF INVENTION

In the general concept for operation of a locking sprag in a clutch or brake unit, an inner race is in motion or driven relative to an outer race, and one or more sprag units are arranged in an annular space between the inner and outer races. For example, the inner race can be coupled to a rotating shaft and the outer race can be fixed to a stationary housing so that the sprag units can act as a brake. Alternatively, the inner race can be coupled to a driven input shaft and the outer race to a rotatable part of a clutch unit. The common operation is that the inner and outer races are in movable relative to each other, and the sprag units engage the races with their sprag surfaces in order to transfer torque from one race to the other.

Figure 1:
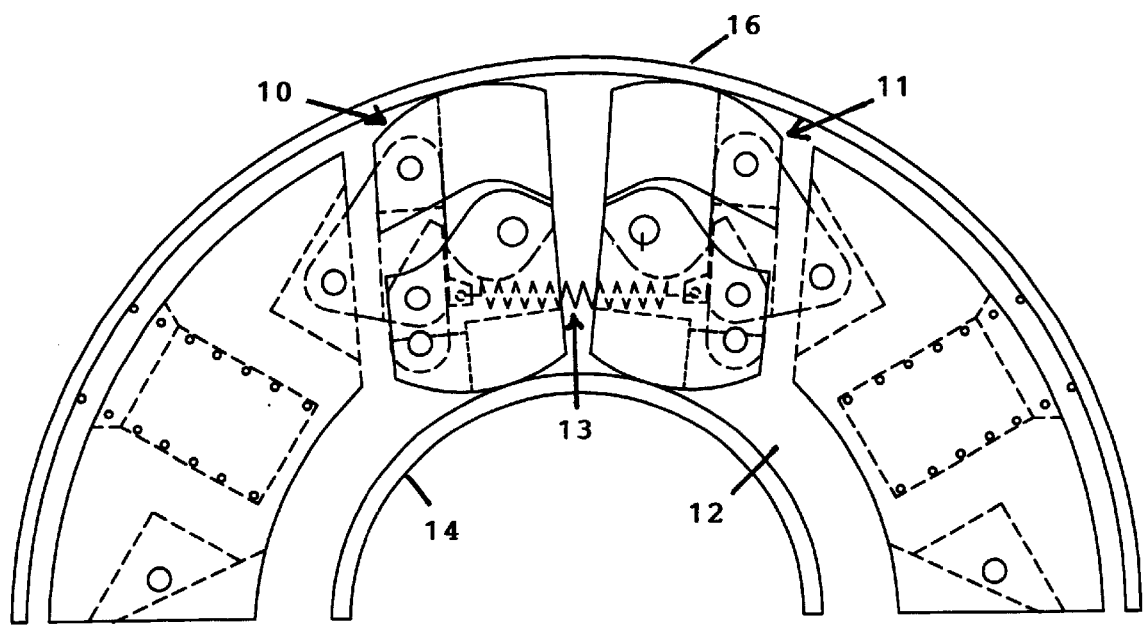
FIG. 1 is a diagram of paired sprag units used in a brake device, in accordance with the present invention.
Figure 3:
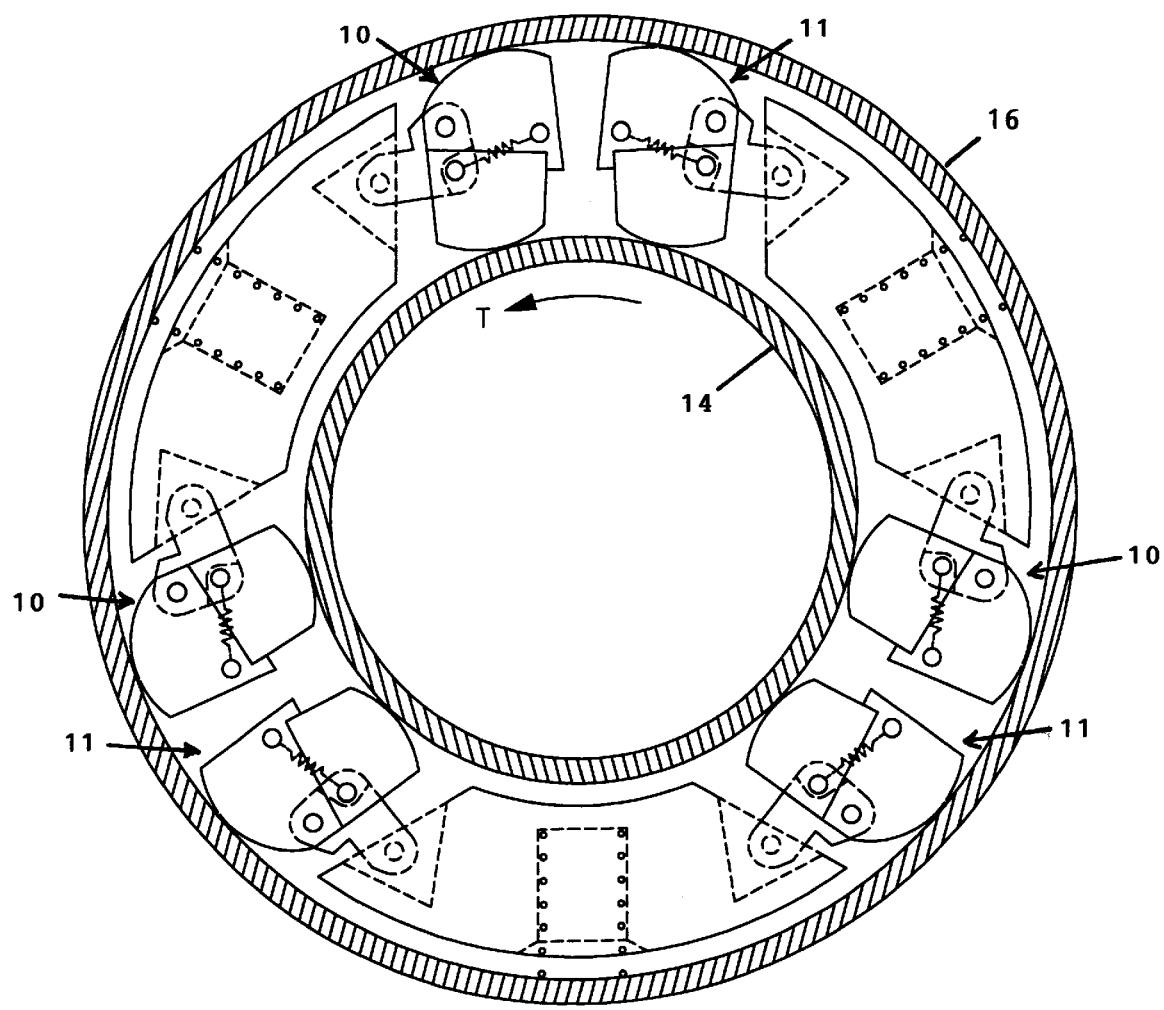
FIG. 3 is a diagram of multiple paired sprag units distributed around the brake device of FIG. 1.

The split locking sprag of the present invention is shown in a brake device in FIG. 1. The brake device is formed by a pair of opposing sprag units 10 and 11 positioned in an annular space 12 between an inner race 14 and an outer race 16 which are rotatable relative to each other in both directions. The left side sprag unit 10 can lock the outer race 16 from counter-clockwise movement relative to the inner race 14, and the right side sprag unit can lock them from clockwise movement. Multiple pairs of sprag units can be spaced circumferentially around the annular space to distribute the braking force more evenly around the axis of rotation, as shown in FIG. 3.

A traditional or solid sprags in a clutch mechanism locks between an outer shaft and an inner shaft when rotational force is applied in one direction, and allow free rotation in the opposite direction. However when such clutches are transferring a torque, the sprags cannot be released from their locked status. In the present invention, with the application of a small external force (F), the sprag can be effectively shortened thus allowing it to become un-locked or released. If two of these-sprags are assembled in opposing directions, as shown in FIGS. 1 and 3, then torque T can be transferred bi-directionally and released as desired in either direction.

In a preferred embodiment of a split locking sprag device as shown in FIGS. 2A to 2D, each sprag unit has an outer sprag subsection or half 20 which is pinned to an inner sprag subsection or half 21 via a main (pivot) pin 22 that allows relative rotation between the two halves. A triangular shaped tripper 23 is pinned at one end to the outer sprag half 20 by pin 24, while another end of it is pinned by pin 25 to one end of a linkage element 26. The other end of the linkage 26 is pinned to the inner sprag half 21 by pin 27. The three smaller pins become aligned when a biasing force is applied to the tripper 23, such as by a biasing or reset spring (13 in FIG. 1) pulling the tripper against a hard stop incorporated within the outer sprag half.

Figure 2A:
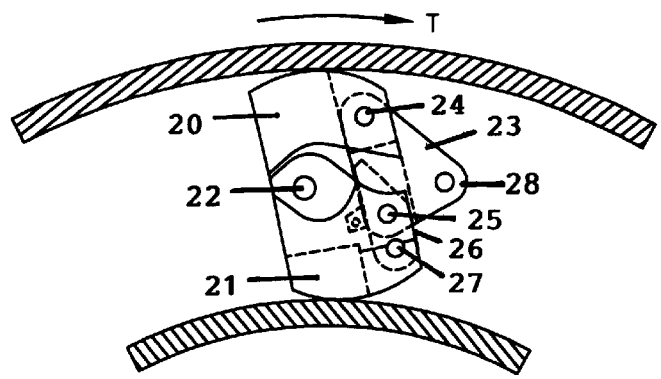
FIGS. 2A–2D illustrate the operation one embodiment of the split locking sprag in accordance with the invention.
Figure 2B:
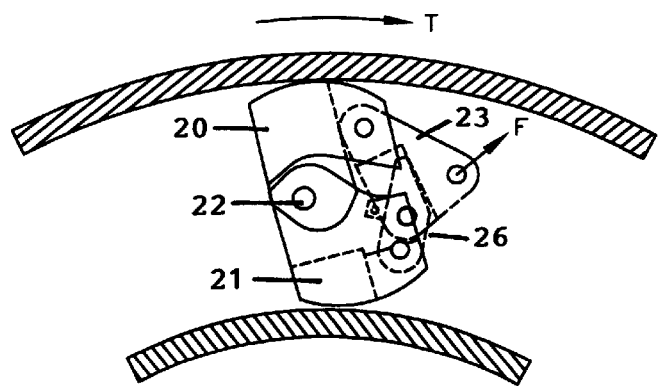

When the three smaller pins are aligned, they are said to be in a Top Dead Center (TDC) configuration, in FIG. 2A. This configuration allows the linkage assembly to support compressive loads on the sprag halves, yet it can be easily buckled with the application of a small external force F applied to the tripper end 28, as shown in FIG. 2B. This external force F can be created using any suitable actuator device, such as electromagnets, mechanical devices, pneumatics, hydraulics, or any other means of generating a force. When the sprag assembly is locked between the outer race and inner race, there is a resultant compressive force acting between the outer sprag half 20 and the inner sprag half 21. This resultant force passes between the main pivot pin 22 and the tripper/linkage assembly 23, 26. This compressive force with the sprag unit locked in the TDC configuration is what allows torque T to be transferred from the inner race to the outer race or vice versa. When the small external force F is applied to the tripper 23, the linkage 26 is pulled by the pin 25 and buckles, thus allowing the sprag halves to rotate relative to each other in order to effectively shorten the overall dimensions of the entire sprag. This foreshortening action results in disengagement of the surfaces of the sprag halves from the race surfaces, and reduces the resultant force on the sprag to zero, thereby causing the torque transferred between inner and outer shaft to drop to zero instantaneously.

Figure 2C:
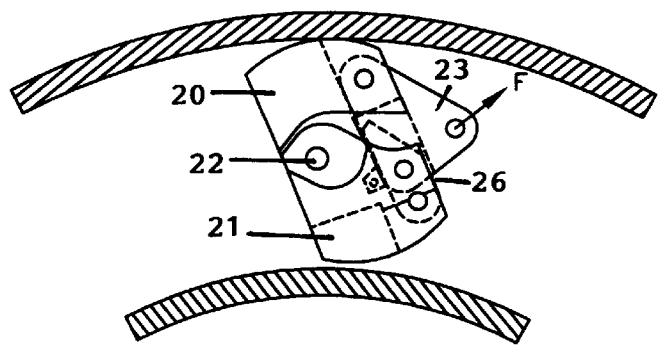
Figure 2D:
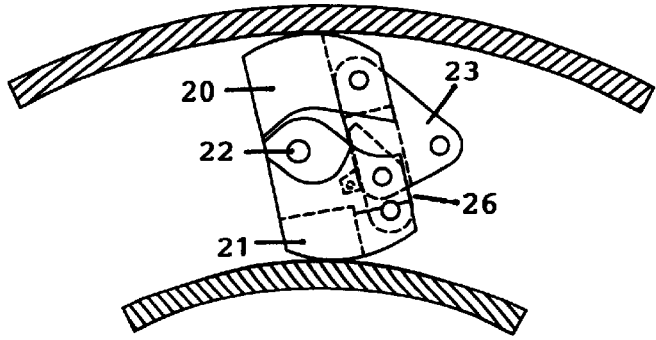

After tripping and release of the compressive force on the sprag halves, the reset spring resets the linkage into TDC configuration, with the unit as a whole still displaced from engagement with the races due to the external force F, as shown in FIG. 2C. When the external force F on the tripper 23 is removed, the sprag as a whole can now rotate back into a locking position between the inner and outer races, as shown in FIG. 2D.

Figure 4A:
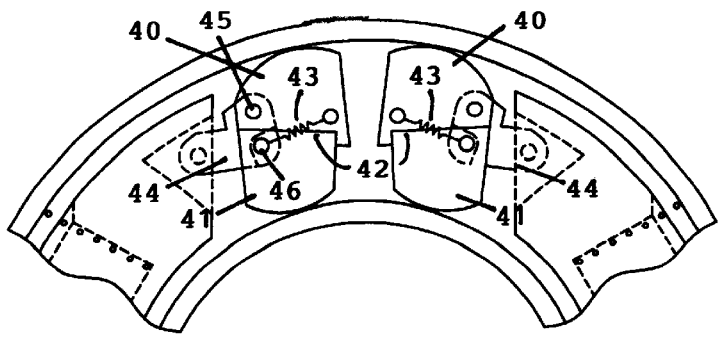
FIGS. 4A–4D illustrate the operation of another embodiment of the split locking.
Figure 4B:
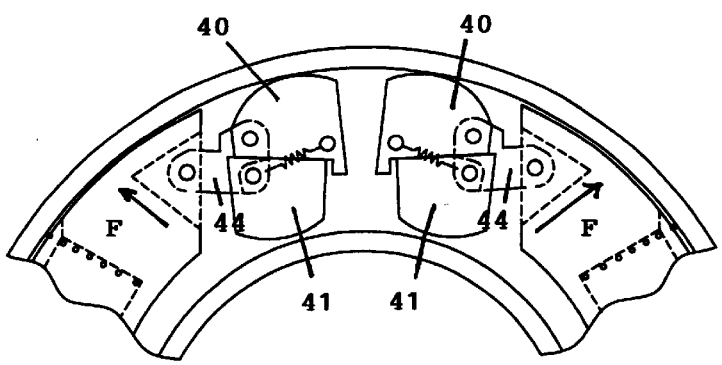
Figure 4C:
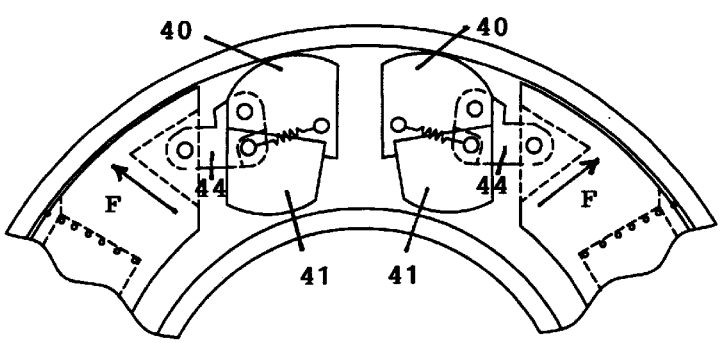

An alternate split locking sprag arrangement is shown in FIGS. 4A–4D which operates in a similar way to the sprag as described in the previous section. Instead of pinning the two halves of the sprag, the alternate embodiment has the two halves 40 and 41 interfacing along a wedged surface 42. By the spring force of the biasing spring 43, the two halves are in a position where their combined dimensions allow the sprag surfaces to engage the races, i.e., the TDC configuration shown in FIG. 4A. If an external force F is applied to the tripper 44 (radially displaceable actuator bar), the tripper rotates slightly and pushes against the pin 45 connected to the outer sprag half 40 while pulling the pin 46 connected to the lower sprag half 41, so that the sprag halves slide relative to each other to an unlocking position. This sliding effectively shortens the dimensions of the sprag as a whole between the races, as shown in FIG. 4B. Similar to the pivot sprag described in the previous embodiment, the foreshortening action reduces the resultant force on the sprag to zero and causes the torque transferred between inner and outer races to drop to zero. The sprag unit is thus displaced from engagement with the inner and outer races, and the reset spring 42 causes the two sprag halves to slide back to their original position, as shown in FIG. 4C.

Figure 4D:
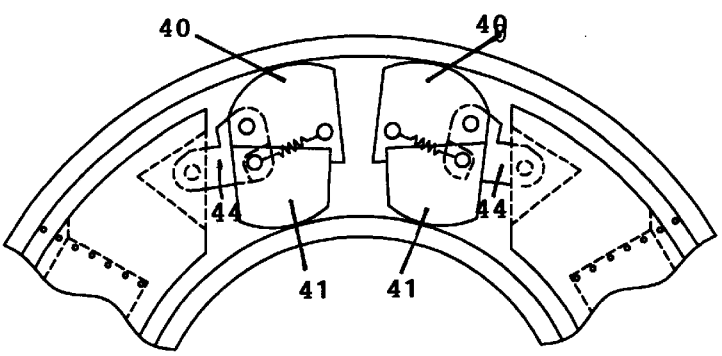

When the external force F on the tripper 44 is removed, the sprag unit as a whole can now rotate back into a locking position where there sprag surfaces can engage with the surfaces of the inner and outer races, as shown in FIG. 4D.

Figure 5:
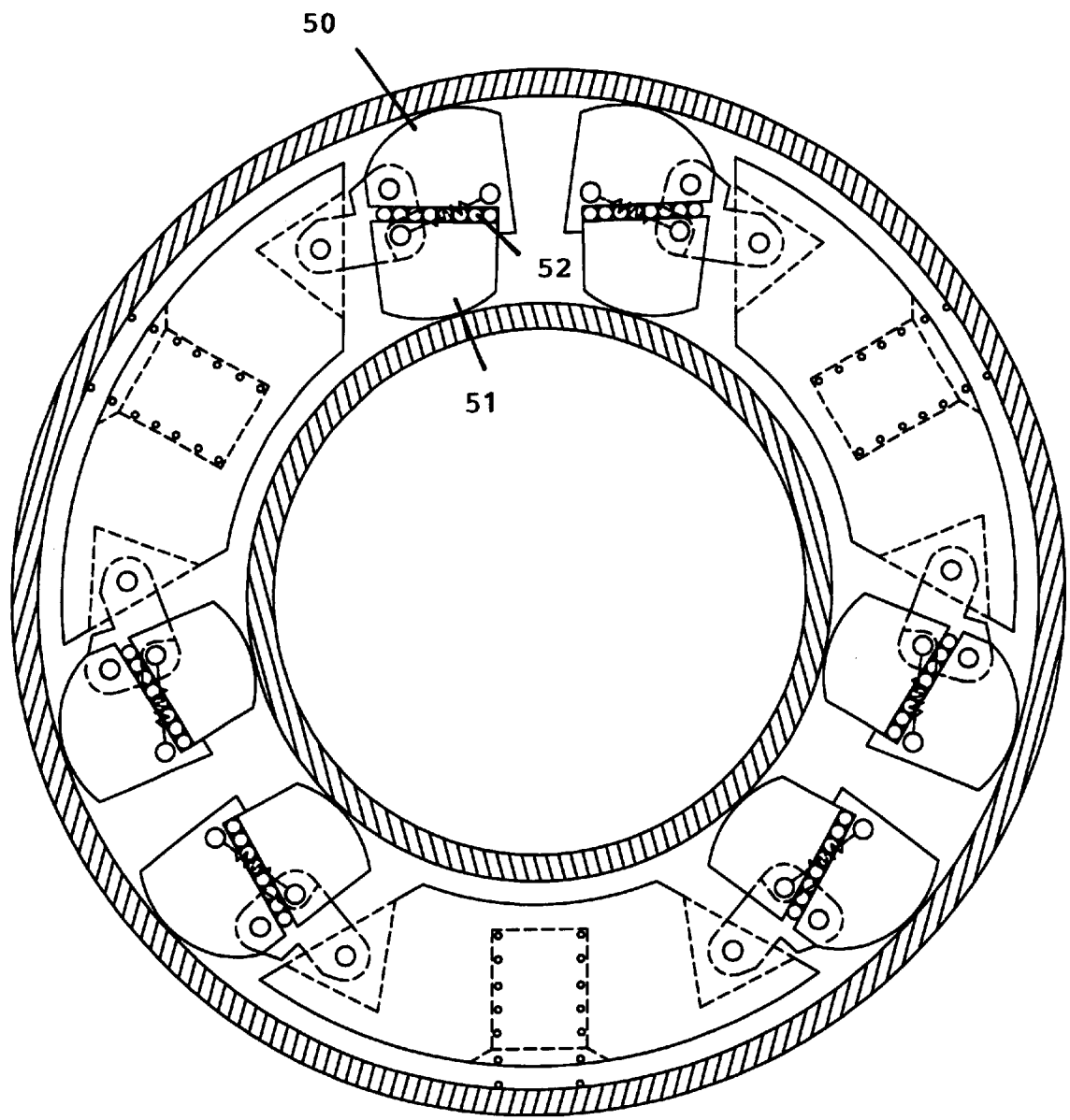
FIG. 5 is a diagram of another version of the split locking sprag of FIG. 4 using needle bearings between the sprag halves.

In FIG. 5, another version of the previous embodiment has needle bearings 52 added between the two sprag halves 50 and 51 in order to reduce friction as the two halves slide past each other. All versions of this invention can also be made to work, as described, in linear bi-directional clutches and brakes.

It is understood that many modifications and variations may be devised given the above description of the principles of the invention. It is intended that all such modifications and variations be considered as within the spirit and scope of this invention, as defined in the following claims.

I claim:

1. A split locking sprag, adapted to be used as a locking element between an inner race portion and an outer race portion which are moved or driven relative to each other, comprising:

(a) a pair of sprag subsections mounted opposite each other between the inner and outer races, wherein one sprag subsection has a sprag surface which is engageable with the inner race and the other sprag subsection has a sprag surface which is engageable with the inner race, said sprag subsections being movable relative to each other between a locking position in which the dimensions of the sprag subsections are combined together to present their respective sprag surfaces for engagement with the inner and outer races, and an unlocking position in which the sprag subsections are moved to change their combined dimensions to allow displacement of their respective sprag surfaces out of engagement with the inner and outer races;

(b) a biasing element for holding the sprag subsections in the locking position; and (c) an actuator element for applying a release force to the sprag subsections to move them to the unlocking position,
    wherein the sprag subsections are sprag halves that are pivotably mounted relative to each other, and the actuator element is a linkage coupled to the sprag subsections and displaceable to allow them to pivot relative to each other.

2. A split locking sprag, adapted to be used as a locking element between an inner race portion and an outer race portion which are moved or driven relative to each other, comprising:

(a) a pair of sprag subsections mounted opposite each other between the inner and outer races, wherein one sprag subsection has a sprag surface which is engageable with the inner race and the other sprag subsection has a sprag surface which is engageable with the inner race, said sprag subsections being movable relative to each other between a locking position in which the dimensions of the sprag subsections are combined together to present their respective sprag surfaces for engagement with the inner and outer races, and an unlocking position in which the sprag subsections are moved to change their combined dimensions to allow displacement of their respective sprag surfaces out of engagement with the inner and outer races;

(b) a biasing element for holding the sprag subsections in the locking position; and (c) an actuator element for applying a release force to the sprag subsections to move them to the unlocking position, wherein the sprag subsections are sprag halves that are slidably mounted relative to each other, and the actuator element is a linkage that is coupled to the sprag subsections and displaceable to allow them to slide relative to each other.

3. A split locking sprag according to claim 2, wherein the sprag subsections are sprag halves with a row of needle bearings between mutual linear sliding surfaces.

* * * * *